(12) United States Patent
Vogel et al.

(10) Patent No.: US 12,483,295 B2
(45) Date of Patent: Nov. 25, 2025

(54) METHOD AND DEVICE FOR SUPPLYING ELECTRICAL POWER TO TWO OR MORE TECHNICAL DEVICES

(71) Applicant: think and vision GmbH, Leoben (AT)

(72) Inventors: Astrid Vogel, Graz (AT); Werner Lindner, Kapfenberg (AT); Bouchra Lamik-Thonhauser, Trofaiach (AT)

(73) Assignee: THINK AND VISION GMBH, Leoben (AT)

( * ) Notice: Subject to any disclaimer, the term of this patent is extended or adjusted under 35 U.S.C. 154(b) by 161 days.

(21) Appl. No.: 18/254,563

(22) PCT Filed: Dec. 2, 2021

(86) PCT No.: PCT/EP2021/083948
§ 371 (c)(1),
(2) Date: May 25, 2023

(87) PCT Pub. No.: WO2022/122542
PCT Pub. Date: Jun. 16, 2022

(65) Prior Publication Data
US 2023/0421202 A1    Dec. 28, 2023

(30) Foreign Application Priority Data
Dec. 7, 2020    (AT) .............. A 51064/2020

(51) Int. Cl.
*H04B 3/54*     (2006.01)
*E21B 47/12*    (2012.01)

(52) U.S. Cl.
CPC .............. *H04B 3/548* (2013.01); *E21B 47/12* (2013.01); *H04B 2203/5416* (2013.01); *H04B 2203/547* (2013.01)

(58) Field of Classification Search
CPC ........... H04B 3/548; H04B 2203/5416; H04B 2203/547; H04B 2203/5475; E21B 47/12
See application file for complete search history.

(56) References Cited

U.S. PATENT DOCUMENTS

| | | | | |
|---|---|---|---|---|
| 4,736,797 A | * | 4/1988 | Restarick, Jr. ........ | E21B 17/003 166/301 |
| 2004/0090805 A1 | * | 5/2004 | Kitano ................. | H02H 7/1227 363/55 |

(Continued)

FOREIGN PATENT DOCUMENTS

| WO | 2010141969 A2 | 12/2010 |
|---|---|---|
| WO | 2013126936 A2 | 9/2013 |

OTHER PUBLICATIONS

International Search Report for PCT/EP2021/083948 mailed Mar. 25, 2022, 5 pages, including English translation.

(Continued)

*Primary Examiner* — Amine Benlagsir
(74) *Attorney, Agent, or Firm* — NIXON & VANDERHYE

(57) ABSTRACT

Disclosed are a method and a device for supplying electrical power for two or more technical systems, which are connected to an electrical supply line with a feed point, arranged in a connecting rod, and for data transmission between the feed point and the technical systems, supplying power to the technical systems is done with essentially constant current intensity. Data transmission from the feed point to the technical systems is done by modulating the current intensity, and data transmission from the technical systems to the feed point is done by modulating the voltage.

16 Claims, 5 Drawing Sheets

(56) References Cited

U.S. PATENT DOCUMENTS

| | | | | |
|---|---|---|---|---|
| 2010/0118983 | A1* | 5/2010 | Weber | H04B 3/548 |
| | | | | 375/257 |
| 2016/0340156 | A1* | 11/2016 | Ost | B66C 23/78 |
| 2019/0338600 | A1* | 11/2019 | Gupta | E21B 15/006 |
| 2020/0095848 | A1* | 3/2020 | Rouse | H02K 7/003 |
| 2020/0408070 | A1* | 12/2020 | Rouse | H02J 3/32 |

OTHER PUBLICATIONS

Written Opinion of the ISA for PCT/EP2021/083948 mailed Mar. 25, 2022, 7 pages.

* cited by examiner

METHOD AND DEVICE FOR SUPPLYING ELECTRICAL POWER TO TWO OR MORE TECHNICAL DEVICES

CROSS-REFERENCE TO RELATED APPLICATIONS

This application is the US national stage of international patent application PCT/EP2021/083948 filed on Dec. 2, 2021, which in turn claims the priority of AT application A51064/2020, filed Dec. 7, 2020, the entirety of which is incorporated herein by reference.

BACKGROUND OF THE INVENTION

Field of the Invention

The invention relates to a method for supplying electrical power for two or more technical systems, which are connected to an electrical supply line with a feed point, arranged in a connecting rod, and for data transmission between the feed point and the technical systems.

In addition, the invention relates to a device for supplying electrical power for two or more technical systems, which are connected to an electrical supply line with a feed point, arranged in a connecting rod, and for data transmission between the feed point and the technical systems.

Description of the Related Art

The drilling industry requires a system that makes it possible to transfer electrical energy and to transmit data during the drilling process.

An essential element in modern drilling processes, in particular in crude-oil, natural-gas, and geothermal drilling, is the data acquisition and control of various modules of the drill string during the drilling process. The same also applies, however, for the subsequent crude-oil, gas, or hot-water production, to which the invention also relates. There is a problem, however, in the real-time data transmission of measurement data between the technical systems of the drill string and the surface or the feed point of the drill rig arranged there. The data are to be transmitted at a high data rate over several kilometers.

Below, i.a. —i.e., only by way of example and not exclusively—both systems and modules, e.g., so-called "downhole tools," which are driven electrically, and measuring systems, sensors, and the like, which require an electrical current supply and/or deliver measurement data for controlling the drilling process and/or the crude-oil, gas, or hot-water production, are referred to as technical systems in terms of the invention. The technical systems are also referred to below as nodes, which are connected to an electrical line on the connecting rod of the drill rig or production unit.

In order to simplify the structural design, the current supply and data transmission are carried out over a common electrical supply line on the connecting rod of the drill rig or production unit, wherein the data on the voltage in the supply line are modulated ("powerline communication" or "PLC"). Current methods use, for example, a high-frequency carrier signal, which is modulated and is superimposed on the supply voltage. By the combination of data transmission and current supply, expensive batteries in the technical systems on the connecting rod can be omitted, and new options arise for the sensor systems in the borehole.

In the connecting rod, a broad-band data link is required in order to transmit, e.g., the data from multiple measurement points, in particular close to the drill head, as quickly as possible to the surface and thus to be able to obtain the data for the planning of an optimum drill penetration rate. The bandwidth over a long connecting rod or a long supply line is, however, limited. A requirement therefore consists in particular in communications with multiple transmitter or receiver nodes along the supply line in the connecting rod, wherein these communications can be carried out simultaneously or sequentially.

From the energy provided to the supply line, the supply of the individual technical systems along the connecting rod is done via the local voltage thereof. It is crucial that the functions of voltage supply and data transmission not affect one another negatively. A conflict exists, i.a., in that a low-impedance line is ideal for voltage supply, whereas a line with a defined resistivity is desired for data transmission.

Usually, DC/DC converters are used for current supply of technical systems, such as modules or measuring systems, in order to reduce the supply voltage on the line (usually 400V) to low voltage (usually 5V to 24V). The voltage drop along the line, however, should not be disregarded because of the length and the limited cross-section. As a result, too little feed power may be present on very widely-spaced nodes. In addition, the space requirement of galvanically-insulated DC/DC converters in the available installation space is a problem.

SUMMARY OF THE INVENTION

The object of the invention is therefore to provide corrective actions here.

This object is achieved with a method with the features disclosed and claimed.

Preferred embodiments are the subject matter of the subclaims.

In this invention, data are transmitted both via the current domains and via the voltage domains, wherein this is combined in an optimal way for the energy supply of the technical systems by data transmission being carried out in the drill string in one direction by modulating the current and in the other direction by modulating the voltage. According to the invention, it is possible to transmit data simultaneously in both directions, by which it is possible both to transmit data from the technical systems to the surface or to the feed point arranged there and to send, for example, commands from the surface to the most varied technical systems in order to be able to define or create, e.g., a desired "drill path."

In contrast to the usual methods of supplying voltage to the consumer, an essentially constant but adjustable, i.e., modulatable, d.c. current is fed according to the invention. Data regarding the technical systems are thus transmitted from the feed point to the surface by modulating the intensity of the current that flows through all series-connected technical systems.

The communication from a technical system to the surface occurs by modulating the voltage on the respective node or the technical system connected thereto.

Thus, a change in the power consumption of the technical system is connected. The power demand of the technical system is to be set in such a way that it is always smaller than the minimum available power. Excess power is thermally reacted and released as waste heat.

Total power consumption is derived from the product of the current and the sum of the voltage drops along the line and the nodes.

In the system according to the invention, a distinction is not made in this case between nodes for communication, nodes for energy supply, and a combination of the latter.

The parallel voltage supply of nodes, common in the state of the art, means in practice that the supply voltage of a node drops because of the voltage drops on the line and nodes with increasing line length in any case upstream from the current consumption.

A quite significant drawback of this conventional method is that the line resistance in connection with the negative input resistance of a switch controller can result in an unstable operating state and thus the power supply collapses on the node. In the case of a constant load, a switching power supply receives constant power in the form of current and voltage at the input. Because of the current consumed, a voltage drop on the line and thus a reduced input voltage on the switching power supply are produced. If the power demand of the switching power supply increases, its input current increases, but the voltage drop along the line also increases and the input voltage on the switching power supply drops. In turn, this has the result that the current still further increases, and the additional dropping of the input voltage resulting therefrom ultimately leads to a tilting effect. More precisely, the latter occurs when the line resistance is greater than the magnitude of the negative differential input resistance of the power supply.

This tilting effect can be avoided by the constant current supply of the technical systems according to the invention. Because of the constant current supply, a constant voltage drop on the line and the technical systems is produced. The nodes, i.e., the connected technical systems, operate as constant-voltage two-terminal devices themselves. As a result, a voltage change is transmitted intact at any point along the current loop to the surface.

In the case of the invention, data transmission and energy supply are combined in an ideal way. The drawback that as a result, depending on the operating state, the efficiency can be lower, plays no role, since enough energy is present on the surface, and the removal of the waste heat is easily possible, and, for example, can be done by fluid flow through the connecting rod, in particular the drilling fluid through the drill pipe.

According to the invention, a simultaneous signal or data transmission for two or more nodes is possible when the latter operate with varying voltage modulation, and thus the derived, multivalent voltage signal can be preferably directly decoded.

The current supply of the nodes is significantly simplified according to the invention. At a minimum, the installation of a constant-voltage two-terminal device (e.g., Zener diode or Z-diode) is sufficient; its voltage drop is the actual supply voltage of the connected component.

According to the invention, it is preferred that any short-circuit current is also limited to this value by a current that can be limited electronically by the supply side, which represents an essential safety component, since a short circuit can be associated with sparking, which can have dramatic results in particular in the case of oil and gas drilling. A short-circuit case is thus under control, regardless of where on the connecting rod or the supply line the short circuit occurs.

When semiconductors are used, in most cases nodes malfunction as a short circuit when there is a defect due to known failure mechanisms of semiconductors. With the system according to the invention, in this case, energy supply and data transmission remain unrestricted in the rest of the system.

An interruption of the conductor loop formed by the supply line is instantly identified when the connecting rod is assembled. For this purpose, no data communication is necessary. The identification of a defective module can be done via a $\Delta I$ measurement (current change) and an evaluation of $\Delta U$ (voltage change).

The entire electronic instrumentation suite in the connecting rod does not require any high-voltage components, since only its input voltage of typically 10V to 20V (can also be more or less) is present at the inputs of a node, rather than the voltage between the go-and-return lines, as was the case in a constant-voltage feed (=parallel switching of all nodes).

Although the combination described below is not mandatory according to the invention, in the case of the invention, a combination of the use of a constant-current source on the feed side, the use of constant-voltage diodes (e.g., Z-diodes, can also be embodied as any other electronic constant-voltage two-terminal devices) in the case of the modules, and the series connection of preferably all modules in a closed circuit is therefore especially preferred. As a result, all modules, independently of their site of installation and the length of the line, are fed by the same current. The power available on the respective module is derived from the loop current and the voltage drop on its constant-voltage diode. Since the voltage drop on these constant-voltage diodes can be selected in the range of the supply voltage required in each case, the design of the voltage supplies on the modules is quite significantly simplified.

In the case of this especially preferred combination, the current that is in each case not required for the supply causes a power loss as a product with the voltage of the constant-voltage diode, which power loss is dissipated into the environment. Because of the very good thermal coupling to the environment in the case of connecting rods in boreholes, this is easily possible. Data transmission from the top, i.e., the feed point, to the modules along the supply line is done by modulating the supply current. Thus, the data are transmitted simultaneously to all modules along the line, since the latter are connected in series for the current supply and in parallel in a certain way in terms of data transmission.

In the case of this especially preferred combination, the controllable current source on the feed side also has a high output resistance, so that it is possible to terminate the line in a simple form with an RC network. Along the connecting rod or the supply line, the impedance ratios of the line are only slightly influenced by the series connection of constant-voltage two-terminal devices. Here, the important factor is their impedance between the conductors or the housing, which can be kept within limits by design methods. Simple monitoring can be done via the flowing loop current, if all modules are supplied in the loop. In the case of an increase in the loop current, how the portion of voltage losses is to be assigned to the individual modules and the portion of the line can be calculated by measuring the increase in current and the associated rise in voltage.

As mentioned, a modulation of the supply current is performed for the transmission from the surface to the modules. In a preferred embodiment of the invention, the modules evaluate this change in current via a resistor connected in series to the current loop.

According to preferred embodiments of the invention, bivalent coding in the form of two different current intensities or a multivalent coding can be used. According to the invention, any more complex forms of a coding can also be used. The selection of the coding and data rate depends primarily on the attenuation properties of the line.

In a preferred embodiment of the invention, for the modulation of the voltage for coding and transmission of data from a module to the surface or feed point, another controllable two-terminal device is connected in series to the constant-voltage two-terminal device (e.g., Zener diode or Z-diode) used for voltage supply. Its voltage drop is typically in the range of 0.1V to 10V, but can also be above or below these limits. Because of the arrangement of these controllable constant-voltage two-terminal devices inside the current loop, the change in voltage also occurs at the outputs of the constant-current source at the feed point. The constant-current source or the control can evaluate the changes in voltage, decode, and output the data stream.

In terms of information technology, the modules can be put on an equal footing in the case of data transmission. Via a selection process, it can be established which module is transmitting.

In a preferred embodiment of the invention, all technical systems have equivalent receivers for the modulated signal. Accordingly, the type of communication occurs in principle from the surface downwards to all technical systems and in each case from a technical system from bottom to top to the surface. Data transmission between technical systems is not ruled out within the framework of the invention.

According to the invention, preferably only one module transmits, wherein in the case of corresponding coding of the data, simultaneous transmission of multiple modules is also possible. The transmission data then occur as the sum of the output voltages on the supply-side current source (constant-current source at the feed point). Also, here, the simple coupling of the transmission data in the supply line is of great advantage.

The modules do not require transmitters on either the receiving side or on the transmitting side, and there is no limitation relative to the lowest data rate. The transmission is therefore suitable in both directions even for a non-return-to-zero coding.

In a preferred embodiment of the invention, the available data rate can be determined automatically so that rectangular changes in current can be transmitted from the top or feed point, the signal shape is assessed downhole, and the attenuation of the line can be deduced therefrom. The system thus automatically adapts to the maximum available data rate based on the line length.

The continual provision of electrical energy is done in principle for each module equally, but a higher energy removal is connected with a higher voltage drop at the constant-voltage diode. Accordingly, a DC/DC converter is optionally necessary, in order to provide higher currents at the outputs of the modules.

Because of the regulation of the primary-side voltage of the DC/DC converter, in the simplest case, unregulated transmitters can be used. The output voltage is therefore derived approximately as a function of the input voltage with the winding ratio. It is thus unnecessary to regulate the voltage on the secondary side or to recycle the output voltage to the primary side for purposes of voltage regulation. This is advantageous in particular in the case of high-temperature applications, since for complex voltage supplies in the high-temperature range, few if any suitable components are available.

BRIEF DESCRIPTION OF THE DRAWINGS

Additional features and advantages of the invention are derived from the subsequent description of preferred embodiments of the invention that are not limited to the scope of protection with reference to the accompanying drawings. Here.

DETAILED DESCRIPTION

Figure 1:
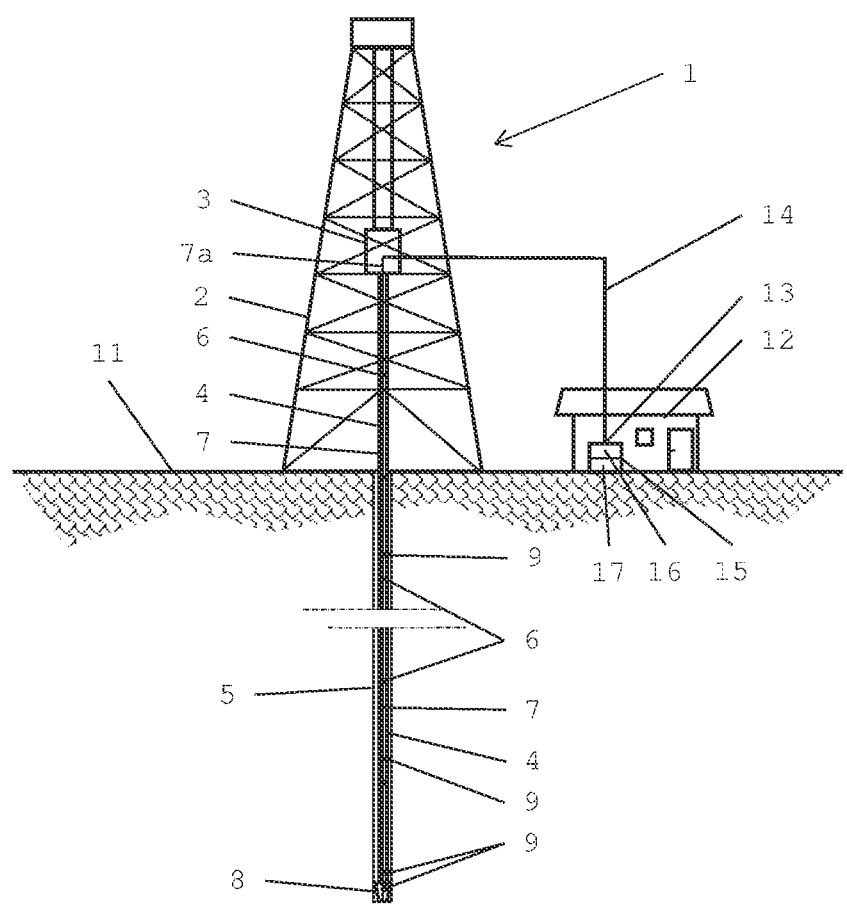
FIG. 1 shows a diagrammatic depiction of a drill rig.

In the drawings, embodiments of the invention are depicted, which embodiments, however, are intended only as examples, and, aside from the features according to the invention as defined in the claims, can also be implemented and/or combined differently within the scope of this invention as regards many components, without this requiring special mention below.

In FIG. 1, a drill rig 1 with an oil rig tower 2 is depicted diagrammatically, with which drill pipes 4 that are connected to a drill string are driven in rotation via a drive 3, a so-called "top drive," in order to produce a borehole 5. It is understood that the design of the drill rig 1 is intended only as an example and can also be implemented in various other ways known from the state of the art.

The drill pipes 4 are connected via couplings 6 to a connecting rod, wherein electrical conductors 7 are arranged in the drill pipes 4, which are depicted and described, for example, as in WO 2013/126936 A and can run inside the drill pipes 4. The couplings 6 make possible in principle a galvanic connection of the electrical conductors 7 that run in the individual drill pipes 4 and can be designed, for example, as depicted and described in WO 2010/141969 A. Another path of the electrical conductor 7 inside the drill pipe and another design of the couplings 6 are, of course, also possible as long as a galvanic connection of the electrical conductor 7 is created in the area of the couplings 6.

At the end of the lowest drill pipe 4 of the connecting rod, there is a drill head 8. In the drill head 8 and, moreover, also on or in several or optionally also all drill pipes 4, there are electrical consumers, sensors, modules, or the like, which are referred to as technical systems 9 and are connected to the electrical conductors 7, which form a supply line 7a in the assembled state.

On the surface, i.e., over the bottom 11 or, for example, a platform of an offshore rig on which the drill rig 1 is arranged, there is in a protected area, for example, a building 12, a container, or the like, a feed point 13 for electrical energy, which can be fed via a connecting line 14 into the electrical conductor 7 of the uppermost drill pipe 4 and thus into the supply line 7a.

The connection of the connecting line 14 to the conductor 7 of the uppermost drill pipe 4 can be done, for example, in the "top drive" 3 by means of a device, as it is described in the Austrian Patent Application No. A 100/2020.

The feed point 13 is arranged in a control unit 15, in which there is a voltage-controlled constant-current source 16 and an electronic control and evaluation unit 17. It goes without saying that the constant-current source 16 and the control and evaluation unit 17 must not be located as depicted as physically proximate or in a single control unit 15.

Figure 2:
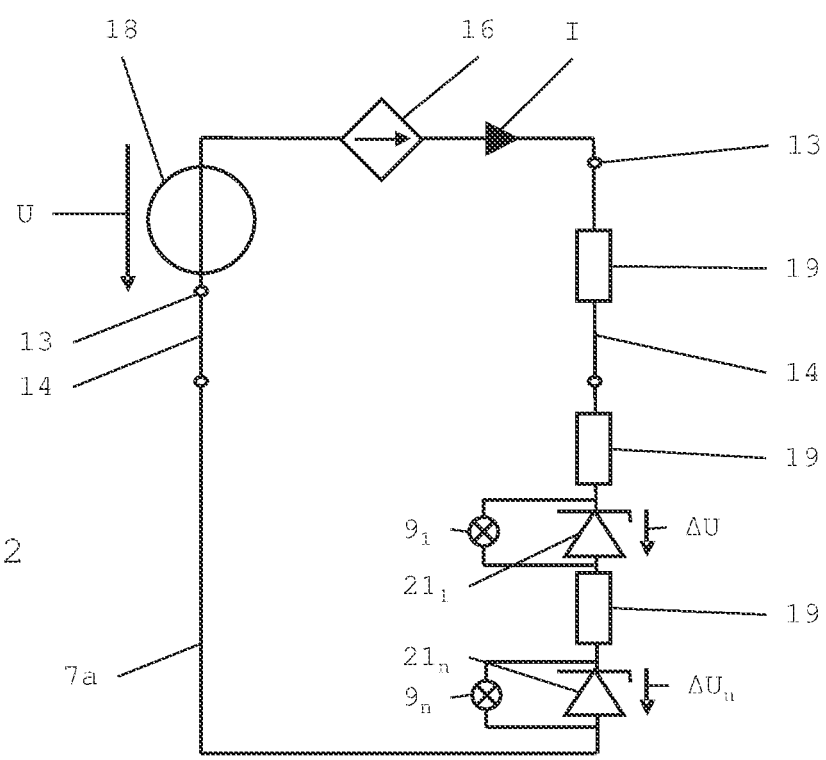
FIG. 2 shows diagrammatically the supply line of a connecting rod of the drill rig.

In FIG. 2, a simple embodiment of the invention is depicted with a supply line 7a that is formed by the electrical conductor 7 and that forms with the connecting line 14 a closed conductor loop. A direct-current source 18 generates a direct current U, and the constant-current source 16 generates a constant current I. The resistors 19 represent the resistors of the connecting line 14 and the electrical conductor 7 in the individual drill pipes 4. Any number of technical systems 91 to 9n are connected to the supply line 7a, specifically parallel to the diodes 211 to 21n, which in each case generate a voltage drop $\Delta U1$ to $\Delta Un$, which in each case defines the supply voltage of the technical systems 9. Because of the current supply via a constant-current source 16 and the defined voltage drop via the diodes 21, a constant and stable power supply of the technical systems 9 is ensured.

Figure 3:
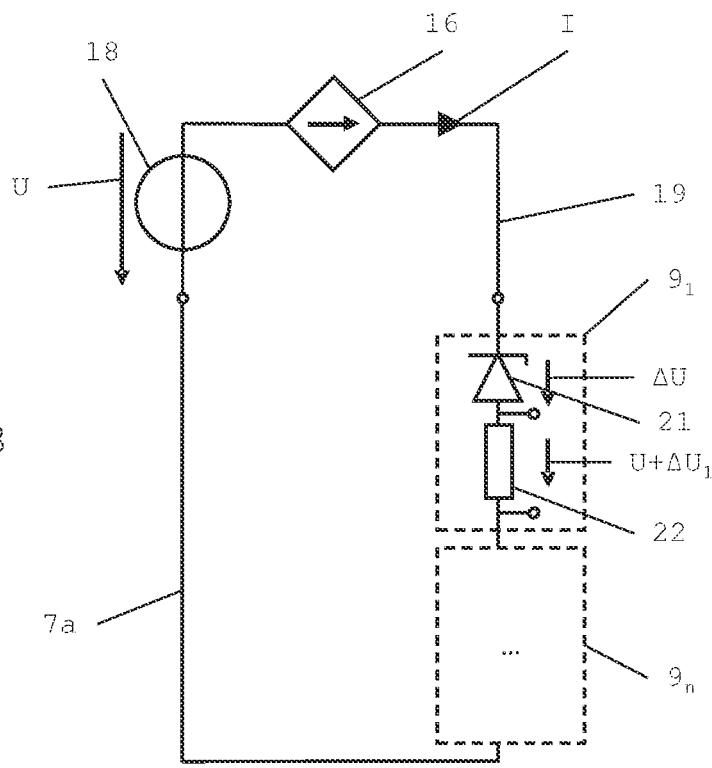
FIG. 3 shows a circuit for evaluating the modulated current.

In FIG. 3, a circuit for evaluating the modulated current for data transmission from the feed point 13 to a technical system 91 to 9n is depicted, in which the technical systems 91 to 9n evaluate this change in current via in each case a series-connected resistor 22, on which the current changes can be measured as the change in voltage $\Delta U1$ superimposed on the voltage drop U at the resistor. The modulation of the current can be performed by, for example, the constant-current source 16 and is detected, evaluated, and—if systems 91 to 9n recognize that they are being addressed—processed by all technical systems 91 to 9n that are equipped with such a suitable circuit or else another suitable circuit.

Figure 4:
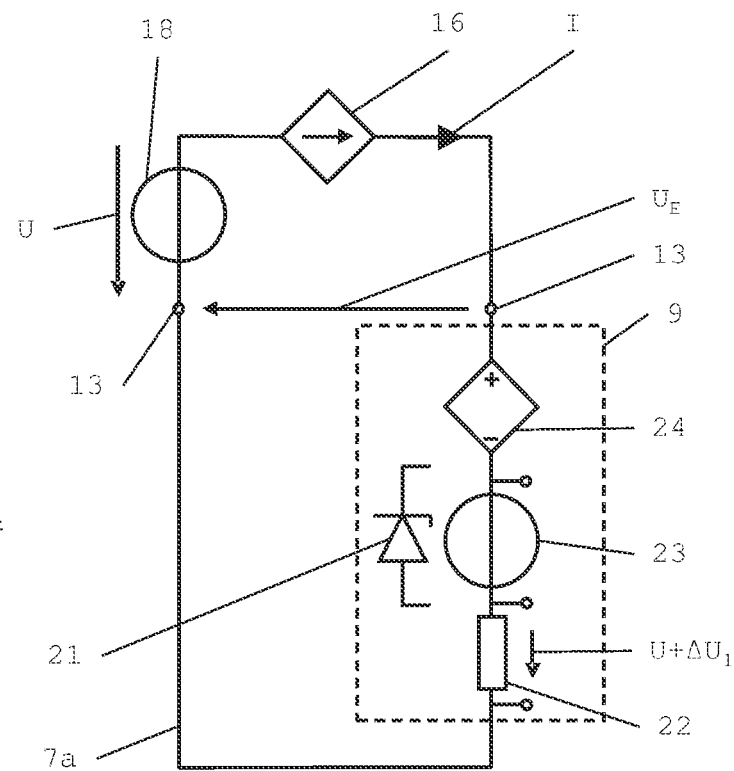
FIG. 4 shows a circuit for modulating voltage.

FIG. 4 shows a circuit for modulating the voltage for data transmission from a technical system 9 to the feed point 13. The technical system in this embodiment of the invention has a DC/DC converter 23 in order to reduce the supply voltage on the line 7a to a lower voltage for supplying a module, sensor or the like. In addition, the technical system in this embodiment of the invention has the circuit, already described with reference to FIG. 3, for evaluating the modulated current for data transmission from the feed point 13 to the technical system 9. In addition, the circuit has a voltage-controlled voltage source 24, with which the voltage in the supply line 7a can be modulated for data transmission, which can be measured and evaluated at the feed point 13 as a modulated received voltage UE.

Figure 5:
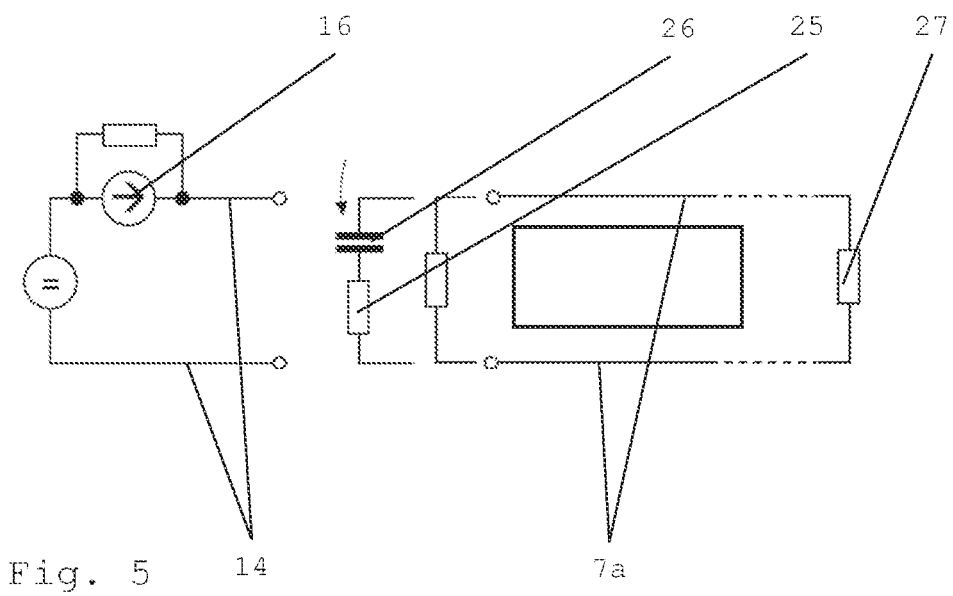
FIG. 5 shows a circuit for terminating the supply line.

In FIG. 5, an example for the termination of the line 7a is depicted with an RC network, which consists of a resistor 25 and a series-connected condenser 26. The resistor 27 represents the resistance or the impedance of the line 7a. On the left side of the circuit diagram of FIG. 5, the feed-side end of the connecting line 14 that is connected to the supply line 7a is depicted with the constant-current source 16.

Figure 6:
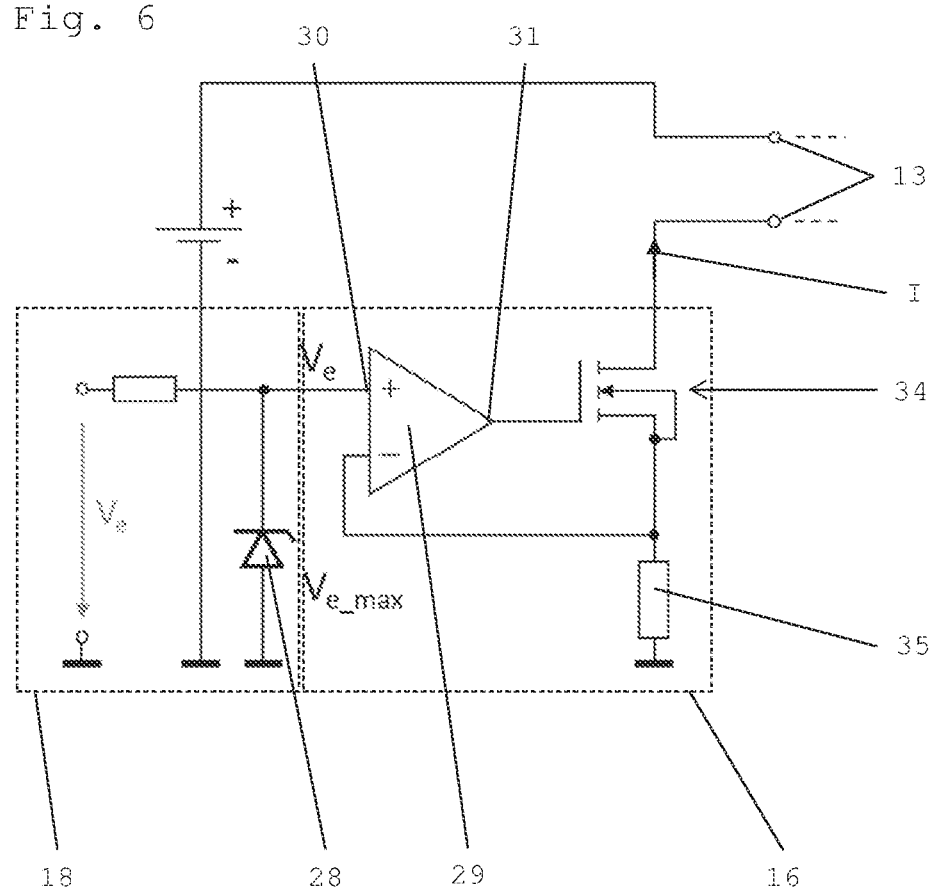
FIG. 6 shows a circuit for modulating current and limiting the short-circuit current.

In FIG. 6, the circuit for modulating current and limiting the short-circuit current is depicted in detail. The direct-current source 18 makes available an adjustable or modulatable direct current Ve, which is limited by a Zener diode 28 to a maximum voltage Ve_max. Via the voltage Ve, which is present at an input 30 of an operational amplifier 29, the adjustable or modulatable direct current I is controlled at the output 31 of the operational amplifier 29, wherein the current is I=Ve/R and—in the case of a short circuit–the maximum current is Imax=Ve_max/R. In connection with its resistor 35, a FET 34 forms a voltage-controlled two-terminal-device current as a feedback loop. The FET already has a high differential output resistance per se. The precision is controlled by the more precise adjustment of the gate voltage on the operational amplifier 29.

Figure 7:
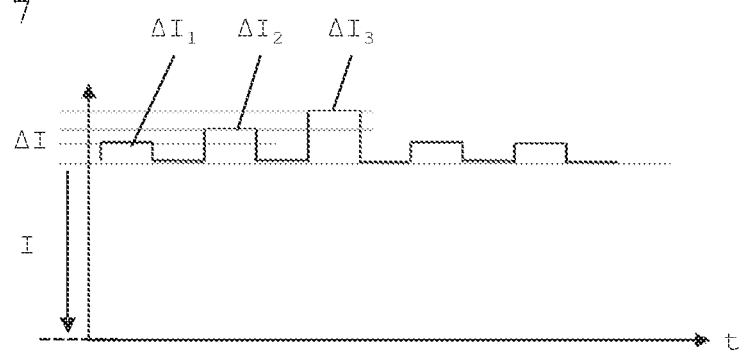
FIG. 7 shows a first option for modulating current intensity.

In FIG. 7, a first option for modulating current intensity is depicted, in which various technical systems 9 with highly variably-modulated current intensities can be addressed or controlled. For example, a first technical system 91 with a lower modulated current intensity $\Delta I1$, a second technical system 92 with an average modulated current intensity $\Delta I2$, and a third technical system 93 with a higher modulated current intensity $\Delta I3$ can be controlled.

Figure 8:
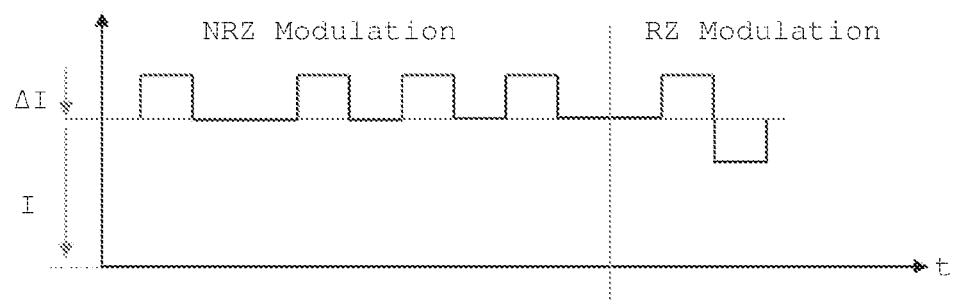
FIG. 8 shows another option for modulating current intensity.

FIG. 8 shows another option for modulating current intensity, in which in the variant depicted on the left in the diagram, as in FIG. 7, a so-called "non-return-to-zero" (NRZ) modulation is applied, and in the variant depicted on the right in the diagram, a so-called "return-to-zero" (RZ) modulation is applied in order to control various technical systems 9.

The two options of FIGS. 7 and 8 can, of course, be combined and are optionally combined with other types of modulations.

Figure 9:
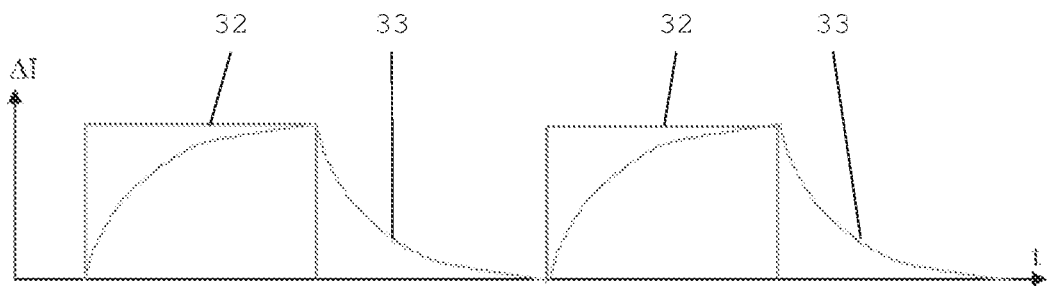
FIG. 9 shows a diagram relating to the determination of the available data rate.

FIG. 9 shows in the form of a diagram how the determination of the available data rate can be carried out. For example, a change in current in the form of rectangular signals 32 can be fed into the line 7a. Due to the attenuation of the line 7a, the rectangular signals are deformed and appear at the lower end of the line 7a on the drill head 8 in the form marked 33. When the signals logical 0 and logical 1 can be clearly distinguished, the maximum data rate is achieved.

Figure 10:
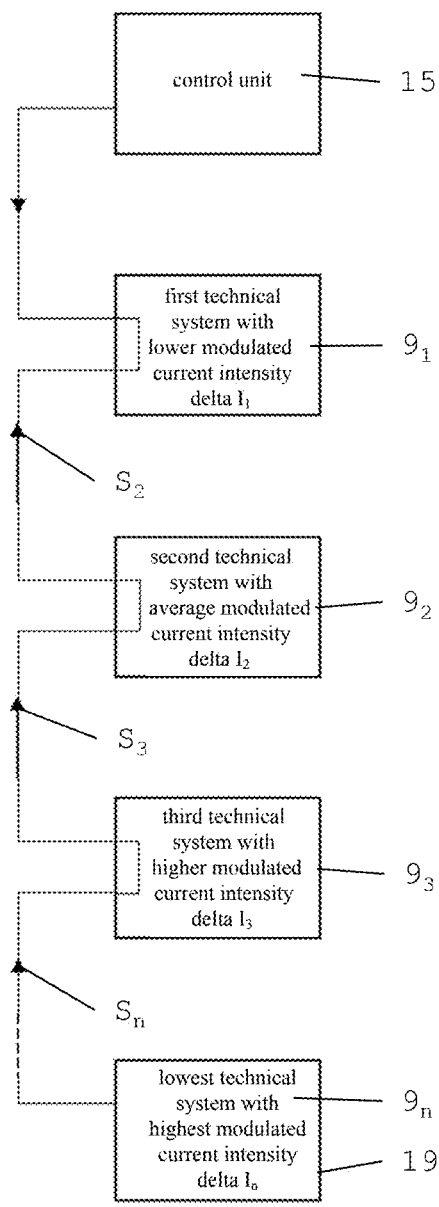
FIG. 10 shows a diagrammatic depiction of a serial data transmission.

In FIG. 10, a serial data transmission from the lowest technical system 9n, e.g., in the drill head 8, via the technical systems 93, 92, and 91 up to the control unit 15 is depicted diagrammatically. The individual signals Sn, S3, and S2 are transmitted to the control unit 15 serially or sequentially in time.

Figure 11:
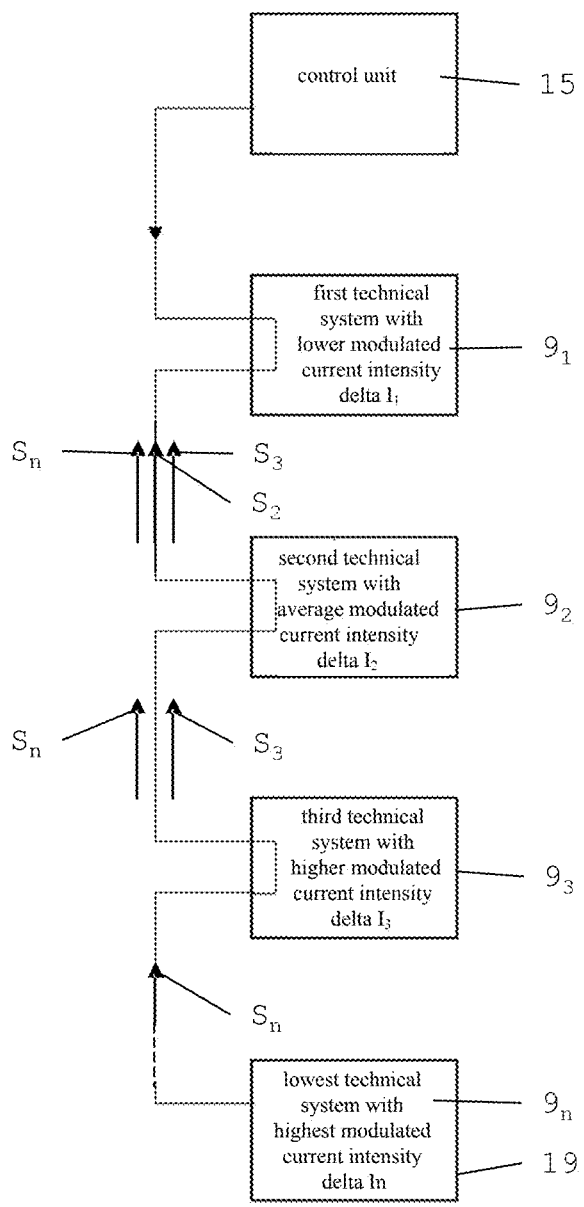
FIG. 11 shows a diagrammatic depiction of a parallel data transmission.

FIG. 11 shows diagrammatically a parallel data transmission from the lowest technical system 9n via the technical systems 93, 92, and 91 to the control unit 15. The individual signals Sn, S3, and S2 are transmitted in parallel or simultaneously to the control unit 15. The data or signals must in this case be modulated differently in the voltage domain, so that they can be correctly assigned by the control unit to the individual technical systems 91 to 9n and evaluated.

The circuits depicted in connection with FIGS. 2 to 11 and their individual components can be combined randomly and can also be replaced or supplemented by other circuitry components both with respect to their number and their design based on the requirements that are set by the technical systems. The same also applies for the described modulation method, which can be combined randomly both with one another and with the described circuits and their individual components.

The invention claimed is:

1. A method for supplying electrical power for two or more technical systems, which are connected to an electrical supply line with a feed point, arranged in a connecting rod, and for transmitting data between the feed point and the two or more technical systems, the method comprising:
  supplying the electrical power to the two or more technical systems with essentially constant current intensity; and
  said transmitting the data from the feed point to the two or more technical systems by modulating the essentially constant current intensity, wherein said transmitting the data from the two or more technical systems to the feed point is done by modulating a voltage in the two or more technical systems, wherein a fed of the essentially constant current intensity is electronically limited to a maximum permissible short-circuit current, and wherein the voltage present at at least one of the two or more technical systems is defined by a constant-voltage two-terminal device on the electrical supply line.

2. The method according to claim 1, wherein the data transmission from the two or more technical systems to the feed point is done serially.

3. The method according to claim 2, wherein the voltage present at at least one of the two or more technical systems is defined by the constant-voltage two-terminal device on the electrical supply line.

4. The method according to claim 1, wherein a simultaneous of the data transmission from the two or more technical systems to the feed point is done by varying the modulation of the voltage.

5. The method according to claim 1, wherein the modulation of the voltage is done by controlling the constant-voltage two-terminal device, which is connected in series to the constant-voltage two-terminal device used for supplying the voltage.

6. The method according to claim 1, wherein a simultaneous of the data transmission from the feed point to the two or more technical systems is done by varying the modulation of the essentially constant current intensity.

7. The method according to claim 1, wherein the two or more technical systems are equivalent receivers for a modulated data.

8. The method according to claim 1, wherein at least one of the two or more technical systems has a resistor that is connected in series to a constant-voltage diode, via which the modulation of the essentially constant current intensity is evaluated.

9. The method of claim 8, wherein the two or more technical systems have said resistor connected in series to the constant-voltage diode.

10. The method of claim 1, wherein the constant-voltage two-terminal device is a constant-voltage diode or Z-diode.

11. A device for supplying electrical power for two or more technical systems, which are connected to an electrical supply line with a feed point, arranged in a connecting rod, and for data transmission between the feed point and the two or more technical systems, the device comprising:
- a constant-current source configured to supply the electrical power to the two or more technical systems;
- a current intensity modulation system configured to modulate a current intensity for the data transmission from the feed point to the two or more technical systems;
- a voltage modulation system configured to modulate a voltage in the two or more technical systems for the data transmission from the two or more technical systems to the feed point; and
- an electronic system in order to limit a fed of the current intensity to a maximum permissible short-circuit current, wherein the voltage present at at least one of the two or more technical systems is defined by a constant-voltage two-terminal device on the electrical supply line.

12. The device according to claim 11, wherein at least one of the two or more technical systems is controlling the constant-voltage two-terminal device, which is connected in series to the constant-voltage two-terminal device used for supplying the voltage in order to modulate the voltage.

13. The device according to claim 11, wherein at least one of the two or more technical systems has a resistor connected in series to a constant-voltage diode, via which the modulation of the current intensity is evaluated.

14. The device of claim 11, wherein the constant-voltage two-terminal device is a constant-voltage diode or Z-diode.

15. A drill rig comprising:
the device according to claim 11.

16. A rig for conveying gaseous or liquid mineral deposits, the rig comprising:
the device according to claim 11.

* * * * *